Patented Dec. 25, 1923.

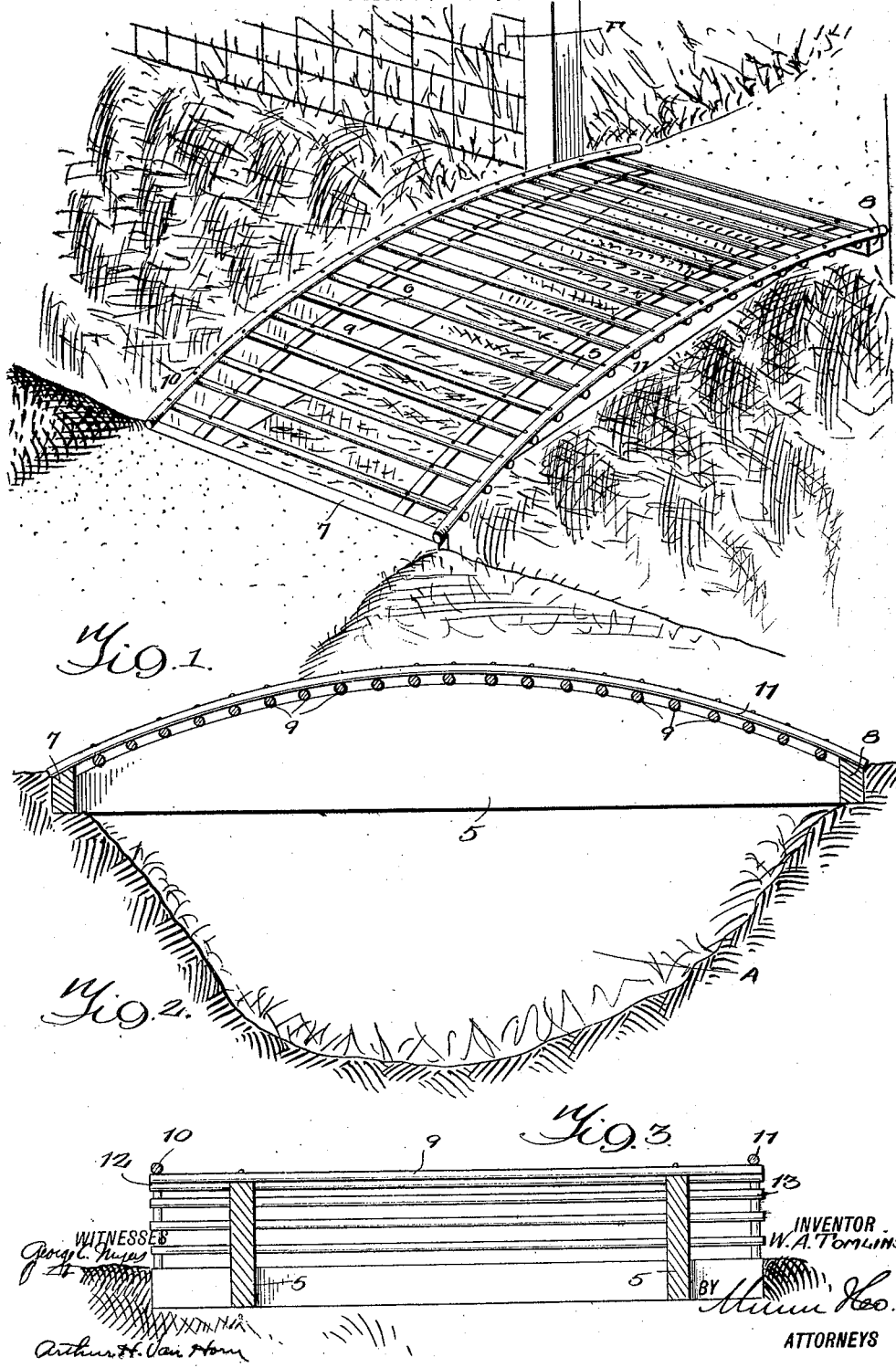

1,478,927

UNITED STATES PATENT OFFICE.

WILLIAM ANDREW TOMLINSON, OF PHOENIX, ARIZONA.

CATTLE GUARD.

Application filed December 13, 1921. Serial No. 522,126.

*To all whom it may concern:*

Be it known that I, WILLIAM ANDREW TOMLINSON, a citizen of the United States, and a resident of Phoenix, in the county of Maricopa and State of Arizona, have invented certain new and useful Improvements in Cattle Guards, of which the following is a specification.

My invention is an improvement in cattle guards.

An important object of my invention is to construct a cattle guard that is arched and will thus more readily discourage cattle in an attempt to pass over the same.

Another object of the device is to produce a cattle guard which will be extremely simple in construction and easy to manufacture.

Other objects and advantages of the invention reside in novel features of construction, combination and arrangement of parts as will be hereinafter more fully described and claimed, reference being had to the accompanying drawings, in which, Figure 1 is a perspective view showing the device in use, Figure 2 is a longitudinal section of the same, and Figure 3 is a transverse section.

In the drawings, A denotes a gutter or gulley, in this instance running parallel with a fence F, and R denotes a roadway passing between the fence posts.

The device comprising my invention is shown bridged across the gulley in Figures 1 and 2 and it is to be understood that although I have shown the invention applied in this way, I do not confine myself to this particular arrangement.

A pair of supporting beams 5 and 6 are provided and have their upper edges arched as shown. End beams 7 and 8 are secured to the supporting beams which form a rigid support for the cross members 9 arranged in spaced relation on the arched surface of the supporting beams.

Tubular metal side bars 10 and 11 are secured to the extremities 12 and 13 respectively, of the cross members 9. These side bars serve as guide or skid rails for a vehicle passing over the guard and prevent its being precipitated into the gulley by skidding and also brace the end portions of the cross members.

The cross members 9 are spaced and secured to the supporting beams at intervals which will make it difficult for animals in passing over the guard and will tend to discourage them in their attempts.

It will be noted that the cross members are formed of material approximately circular in cross section. This feature will also have a tendency to turn back cattle intent on passing through the opening in the fence. Although the cattle guard thus shown and described will be effective in keeping cattle within their bounds, it will not be an obstruction to passing vehicles or persons afoot.

In use, the guard may be placed over a ditch, gulley, or the like in the manner shown in the drawings, and, as already pointed out, will tend to obstruct the passage of cattle but will not hinder vehicular traffic.

In the preferred form of my invention shown in the drawings I provide an arched guard which is more noticeable to stock.

Although I have herein shown and described only one form of my invention, it is to be understood that various changes and modifications may be made herein without departing from the spirit of the invention or the spirit and scope of the appended claim.

I claim:

In a stock guard, a pair of spaced supporting beams, each having the lower face thereof substantially flat and the upper face thereof arched, spaced transverse tread members secured thereto and extending beyond the sides of the supporting members, and guard bars resting upon the tread members at the ends thereof and secured thereto.

WILLIAM ANDREW TOMLINSON.